United States Patent
Godowski et al.

(10) Patent No.: US 11,347,900 B2
(45) Date of Patent: May 31, 2022

(54) AUTOMATED WEB SESSION TIMEOUT ENFORCEMENT

(71) Applicant: International Business Machines Corporation, Armonk, NY (US)

(72) Inventors: Piotr P. Godowski, Cracow (PL); Michal Paluch, Cracow (PL); Tomasz Hanusiak, Cracow (PL); Szymon Kowalczyk, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 16/740,351

(22) Filed: Jan. 10, 2020

(65) Prior Publication Data
US 2021/0216668 A1     Jul. 15, 2021

(51) Int. Cl.
| | |
|---|---|
| *G06F 11/34* | (2006.01) |
| *G06F 21/84* | (2013.01) |
| *G06F 11/30* | (2006.01) |
| *H04L 67/02* | (2022.01) |
| *H04L 67/50* | (2022.01) |

(52) U.S. Cl.
CPC ............ *G06F 21/84* (2013.01); *G06F 11/302* (2013.01); *G06F 11/3438* (2013.01); *H04L 67/02* (2013.01); *H04L 67/22* (2013.01)

(58) Field of Classification Search
CPC ..................................................... G06F 67/50
See application file for complete search history.

(56) References Cited

U.S. PATENT DOCUMENTS

| | | | |
|---|---|---|---|
| 7,302,370 B2 | 11/2007 | Nickerson et al. | |
| 8,117,560 B1 * | 2/2012 | Lu ........................ | G06F 3/0481 715/789 |
| 8,943,036 B1 | 1/2015 | Coudron | |
| 10,043,014 B1 * | 8/2018 | Hadsall ................. | G09G 5/003 |
| 10,326,789 B1 * | 6/2019 | Vines ..................... | H04L 67/02 |
| 10,528,213 B2 * | 1/2020 | Ikeda .................... | G06F 3/1431 |
| 10,852,905 B1 * | 12/2020 | Guzman ............... | G06F 3/0482 |
| 2008/0228910 A1 * | 9/2008 | Petri ..................... | G06F 11/3438 709/224 |
| 2016/0070466 A1 * | 3/2016 | Chaudhri ............. | G06F 3/04883 715/765 |
| 2016/0269417 A1 | 9/2016 | Saxena et al. | |

FOREIGN PATENT DOCUMENTS

CN             105956450 A     9/2016

* cited by examiner

*Primary Examiner* — Di Xiao

(57) ABSTRACT

An example operation may include one or more of detecting a web session within an open window of a web browser on a user device, monitoring for user activity on the user device with respect to the web browser, determining there has been a lack of user activity with respect to the web browser for a predetermined amount of time based on the monitoring of the user activity, and temporarily concealing content within the open window of the web browser in response to the lack of user activity.

20 Claims, 8 Drawing Sheets

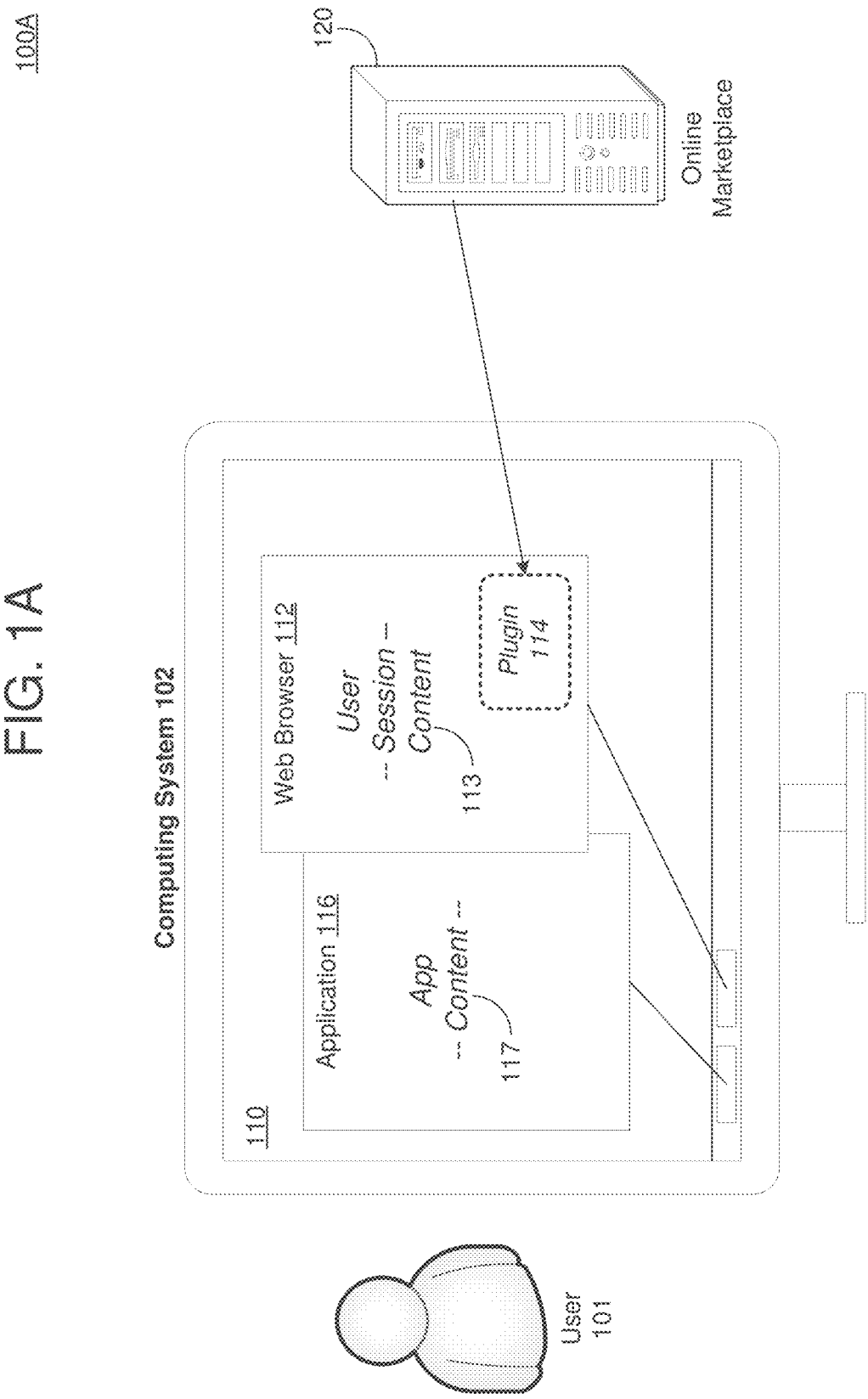

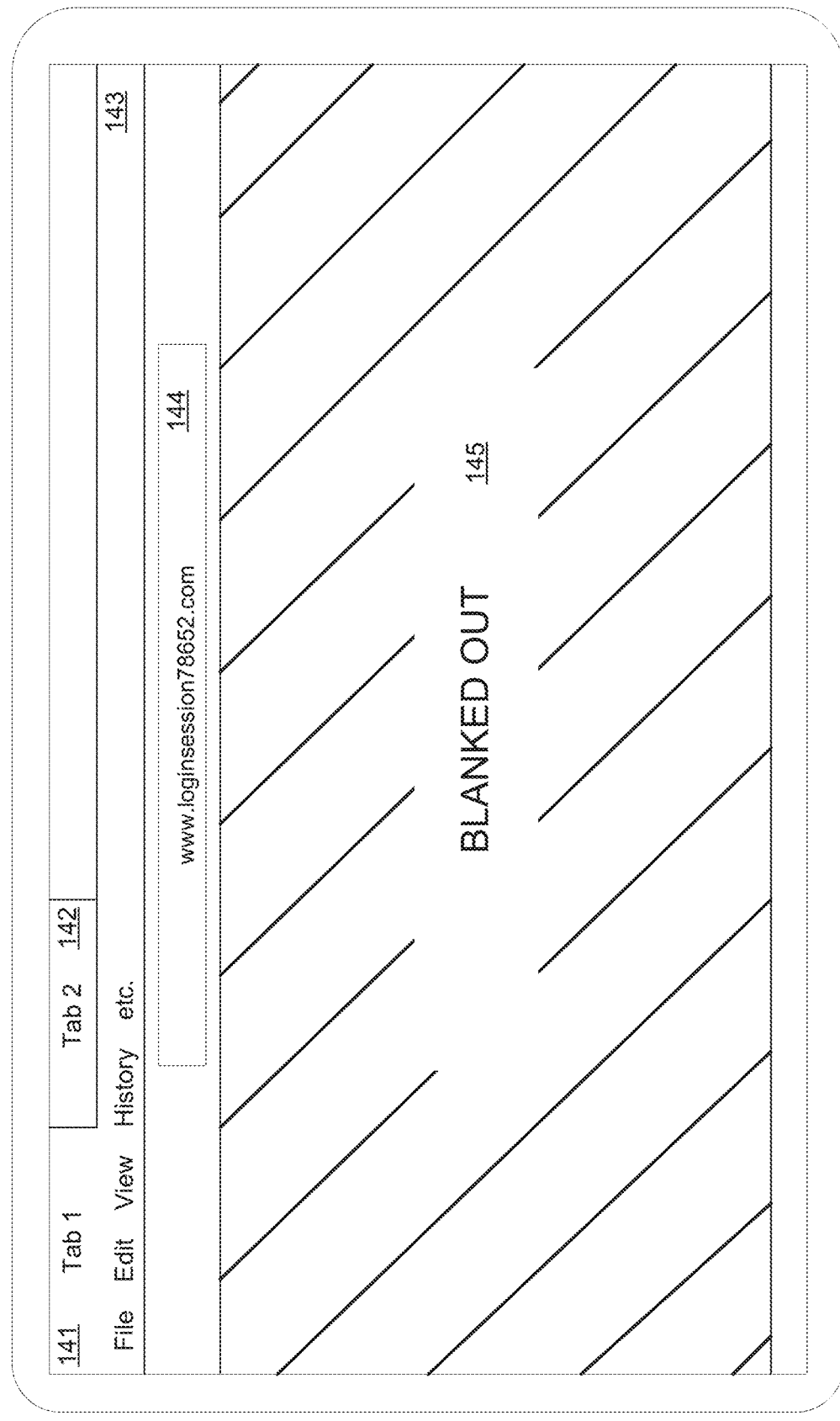

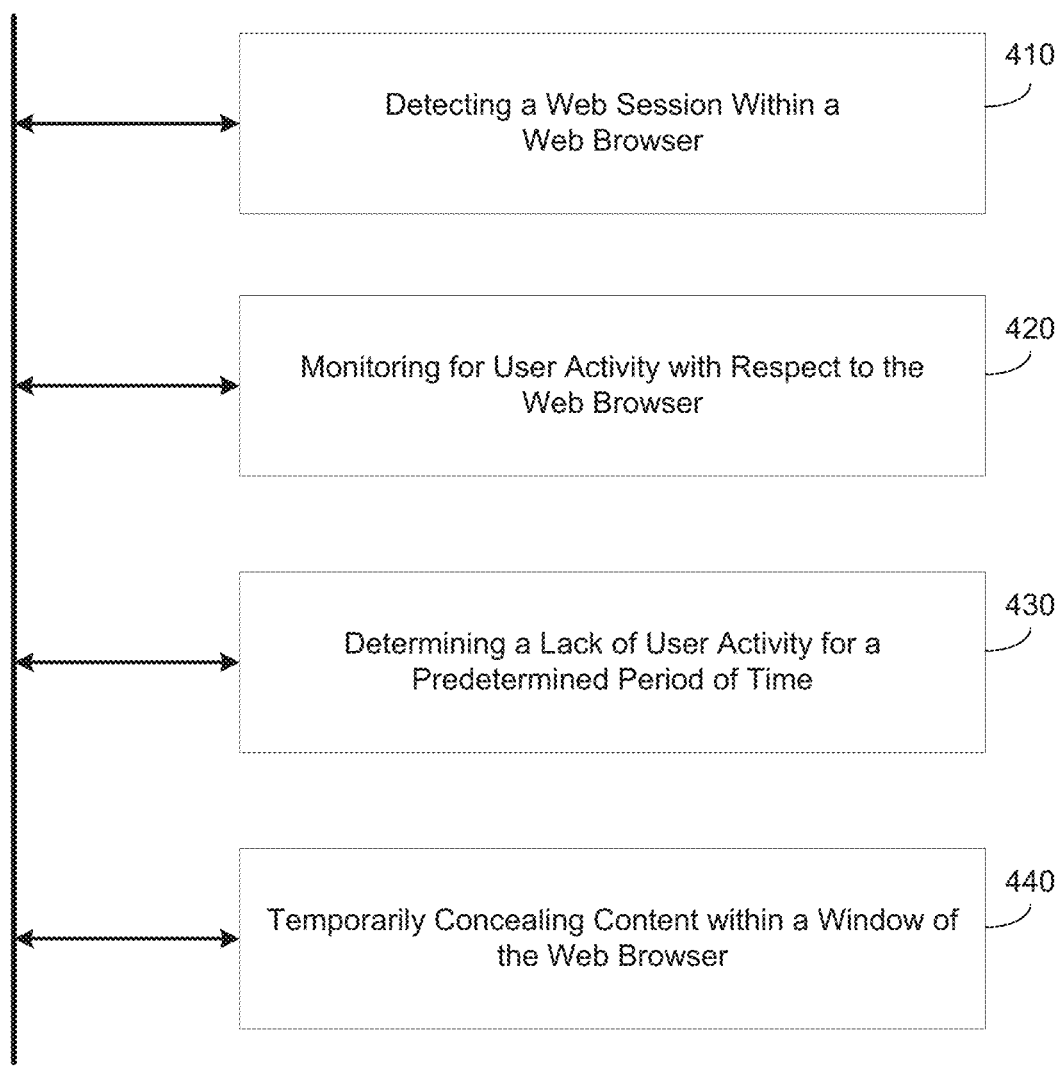

AUTOMATED WEB SESSION TIMEOUT ENFORCEMENT

TECHNICAL FIELD

This application generally relates to security of authentication data within a web session, and more particularly, to a web browser element which can detect an open web session and automatically conceal content therein after identifying a period of inactivity.

BACKGROUND

A web session may include a sequence of network requests/responses between a web browser and a host system. Each request may be associated to a same user. Modern and complex web applications require information or status about the user to be maintained for the duration of the requests. Sessions provide the ability to establish variables such as access rights and localization settings which apply to each interaction the user has with the web application for the duration of the session.

In some cases, web applications can create sessions to keep track of anonymous users after the very first user request. An example would be maintaining the user language preference. Additionally, web applications make use of sessions once the user has been authenticated. This ensures the ability to identify the user on any subsequent requests as well as apply security access controls, authorized access to private user data, and increase the usability of the application. Current web applications can provide session capabilities both pre and post authentication.

Web sessions often involve sensitive data being exchanged and displayed, therefore making the sessions susceptible to hijacking/fraud. In addition, the sensitive data is often displayed on the screen of a user device making the sensitive vulnerable to other users/people visibly reading such information from the screen. This situation frequently occurs when a user walks away from their device or otherwise becomes distracted. As such, what is needed is a solution that improves and overcomes these drawbacks and limitations.

SUMMARY

One example embodiment may provide a system that includes a processor configured to one or more of detect a web session within an open window of the web browser, monitor for user activity of the apparatus with respect to the web browser, determine there has been a lack of user activity with respect to the web browser for a predetermined amount of time based on the monitored user activity, and temporarily conceal content within the open window of the web browser in response to the lack of user activity.

Another example embodiment may provide a method that includes one or more of detecting a web session within an open window of a web browser on a user device, monitoring for user activity on the user device with respect to the web browser, determining there has been a lack of user activity with respect to the web browser for a predetermined amount of time based on the monitoring of the user activity, and temporarily concealing content within the open window of the web browser in response to the lack of user activity.

A further example embodiment may provide a non-transitory computer readable medium comprising instructions, that when read by a processor, cause the processor to perform one or more of detecting a web session within an open window of a web browser on a user device, monitoring for user activity on the user device with respect to the web browser, determining there has been a lack of user activity with respect to the web browser for a predetermined amount of time based on the monitoring of the user activity, and temporarily concealing content within the open window of the web browser in response to the lack of user activity.

BRIEF DESCRIPTION OF THE DRAWINGS

FIGS. 1A-1B are diagrams illustrating processes for automated enforcement of a web session timeout according to example embodiments.

FIG. 1C is a diagram illustrating a web browser when content therein is blanked out according to example embodiments.

FIG. 4 is a diagram illustrating a method of obscuring content of an active web session after a period of inactivity according to example embodiments.

DETAILED DESCRIPTION

Figure 1B:
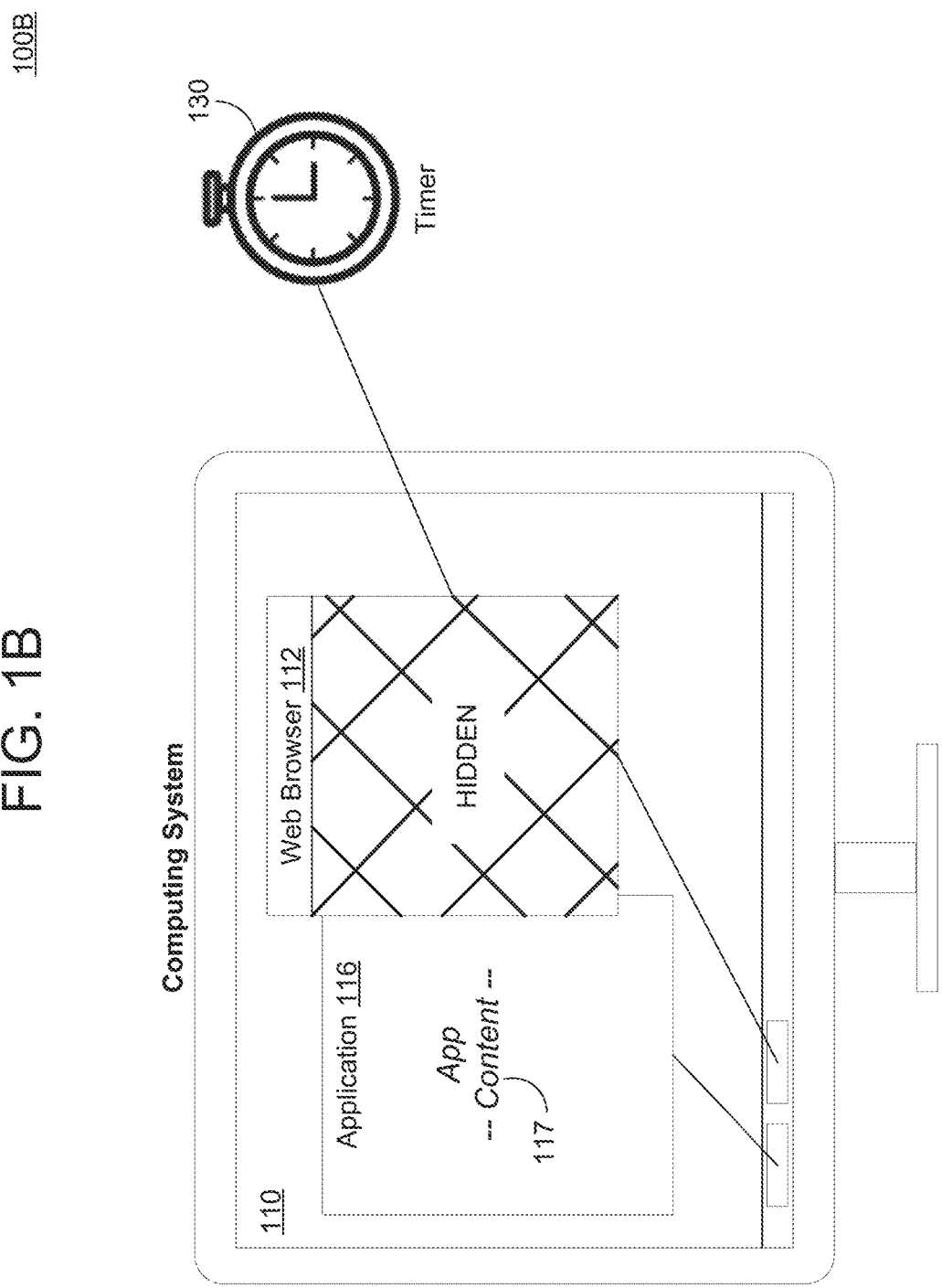

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Web applications often provide a web interface requiring the end-users to log-in to use a web portal, and the like. Through the web application, the user may interact with sensitive/private user data including email, social networking sites, online documents, hosted applications, digital wallets, bill payment portals, financial accounts, and the like. One of the issues with such web sessions is that they are non-expiring on the user's side. In other words, the web session will continue indefinitely on the user device. Non-expiring web sessions may have severe consequences including data leak, hijacked sessions, and the like, to users that are within a viewing area of a screen of the user device.

The example embodiments provide a solution to the issue of non-expiring web sessions. In particular, a web page may be concealed locally on the user device. A plugin may be installed within a web browser of the user device and may detect when a user session has started or is otherwise occurring on the web page. For example, the plugin may detect one or more prerequisites (e.g., evidence) of a user's session with a website, for example, a login field, a password field, cookies data, or the like, which indicates that a user session has started. If the plugin does not detect one of the prerequisites, then the plugin may take no action. When the user session is detected, the plugin may create a timer that starts after user activity with respect to the web browser has ceased. When additional user activity occurs, the timer can be reset. However, if no user activity is detected for the duration of the timer, and the timer expires, the plugin may temporarily conceal the web page (and the content of the web session) within the web browser of the user device. For example, a shadowing or blanking operation may be performed on the web page thereby concealing any information therein. When the user resumes activity, the plugin may remove the temporary concealment thereby revealing the active web session content again. Although the examples herein describe the use of a plug-in, in some other embodiments, the temporary concealing process may be performed by the web browser itself. That is, the functionality of the concealing, the timer, the obscuring, etc., may be built into the web browser instead of relying on a plug-in.

The temporary concealing process described herein is different from a traditional screen saver operation for multiple reasons. In particular, a traditional screen saver works on the operating system desktop level, resulting with entire screen being hidden by the screen saver. In contrast, the plugin may conceal only the content of a web page/web browser rather than an entire screen. That is, the automated session timeout works on the individual application level (e.g. a web browser), meaning that the other applications running on the same desktop session are not concealed and the end user can continue working. For example, the remainder of the screen including other applications, background, content, and the like, is not concealed, only the web browser including the web session.

FIGS. 1A-1B illustrate processes 100A and 100B for automated enforcement of a web session timeout according to example embodiments. Referring to FIG. 1A, a user 101 interacts with a computing system 102 to open a web session via a web browser 112 displayed on a screen 110 of the computing system 102. Here, the web session includes sensitive content 113 display within an open window of the web browser 112. For example, the web session displayed within the web browser 112 may be a banking application, a web portal, a hosted application, an online document, a social media site, and the like. In addition to the web browser 112 including the web session, the user 101 is also interacting with a local application 116, for example, word processor, spreadsheet, image-based, audio-based, or the like, which does not include an active web session. The local application 116 includes non-web content 117.

In this example, a plugin 114 may detect when a session has begun within the web browser 112 based on one or more prerequisites. For example, the plugin 114 may detect various elements within the user interface such as a login field, a username field, a password field, etc. As another example, the plugin 114 may detect cookie data, an exchange of HTTP messages between the web browser 112 and a host of a website/application, and the like. When one of these elements is identified, the plugin 114 may detect that a user session is being performed within the web browser 112.

According to various embodiments, the plugin 114 may be downloaded, for example, from an online marketplace 120 or some other repository and installed within the web browser 112 on the computing system 102. The plugin 114 may be downloaded from a general repository, where different web browsers plugins are hosted. In some embodiments, each type of web browser may have its own marketplace where plugins are hosted. The user 101 may download the plugin 114 from such marketplace location. As another example, an administrator may pre-configure a web browser with the plugin downloaded in advance.

The plugin 114 may execute the web session timeout enforcement process described herein to temporarily conceal content of the web session when user activity has ceased for a predetermined amount of time. In this example, the plugin 114 may include a software component that adds an additional feature (web session timeout) to an existing web browser 112 and its functionality. The plugin 114 may be an executable that extends the functionality of the web browser 112 to perform the web session timeout.

Referring to FIGS. 1A-1B, once the plugin 114 has detected the occurrence of a user session within the web browser 112, the plugin 114 may monitor the user 101 (user activity) based on commands input by the user 101 with respect to the web browser 112 and/or the computing system 102. For example, the plugin 114 may monitor whether the user 101 has made a selection via an input unit such as a mouse, keyboard, scanner, etc., with respect to the web browser 112. Here, the plugin 114 may monitor keystrokes, mouse clicks, page scrolls, and the like, with respect to the web browser 112. In some embodiments, the plugin 114 may detect whether a cursor has been moved by a pointing device/finger over/across an open window of the web browser 112. In such cases, the plugin 114 may determine that user activity with respect to the web browser 112 is present.

According to various embodiments, the plugin 114 may also start a timer 130 after each user action. Here, the timer 130 may be reset each time a new action is detected. If, however, no action is detected for the duration of the timer 130, the plugin 114 may conceal content within a window of the web browser 112 as shown in FIG. 1B. The concealing may include overlaying blank window on top of the window. As another example, the concealing may include shadowing the window with grey, black, white, or some other color. Other methods may be performed to hide or otherwise block content within the web session from being visible on the screen 110 of the computing system 102. The concealing may be temporary. In particular, when the user 101 performs another action with respect to the web browser 112 such as a mouse over, a keystroke, a scrolling, etc., the plugin 114 may remove the concealment from the web browser 112 returning again to the view shown in FIG. 1A.

FIG. 1C illustrates a web browser 140 when content therein is blanked out according to example embodiments. In the example of FIG. 1C, the web browser 140 includes a plurality of tabs 141 and 142 representing different applications being visited through the web browser 140. According to various embodiments, the plugin (not shown) may protect sensitive data being rendered by a particular web application within its respective browser tab. In this example, browser tab 141 includes a user session that has expired. Accordingly, the plugin has blanked out a page content area 145 of the browser tab 141. Meanwhile, other visual elements of the content within the browser tab 141 including a menu 143, a search bar 144, the tab 142, toolbars, background, etc., are not blanked out. Therefore, the concealing process may hide only the window content within the browser tab 141 rather than blank out the entire tab/screen. For example, menu 142 (including items such as File, Edit, View, History, etc., may still be viewable.

As another example, a browser tab with a hidden window (i.e., browser tab 142 in FIG. 1C) which is obscured by another browser tab that is open (i.e., browser tab 141 in FIG. 1C) may also be timed out and obscured even when it is not the tab in focus (currently being viewed) on the screen. In other words, the content within the browser tab 142 may be blanked out even when the content is hidden because tab 141 is open instead. This can ensure that the sensitive data therein is not accidentally exposed by the closing of a window, etc. In some embodiments, each of the browser tabs 141 and 142 may be independently managed by the plugin. In other words, it is not necessary to blank out both tabs 141 and 142, when only one of the tabs has a session.

Figure 2:
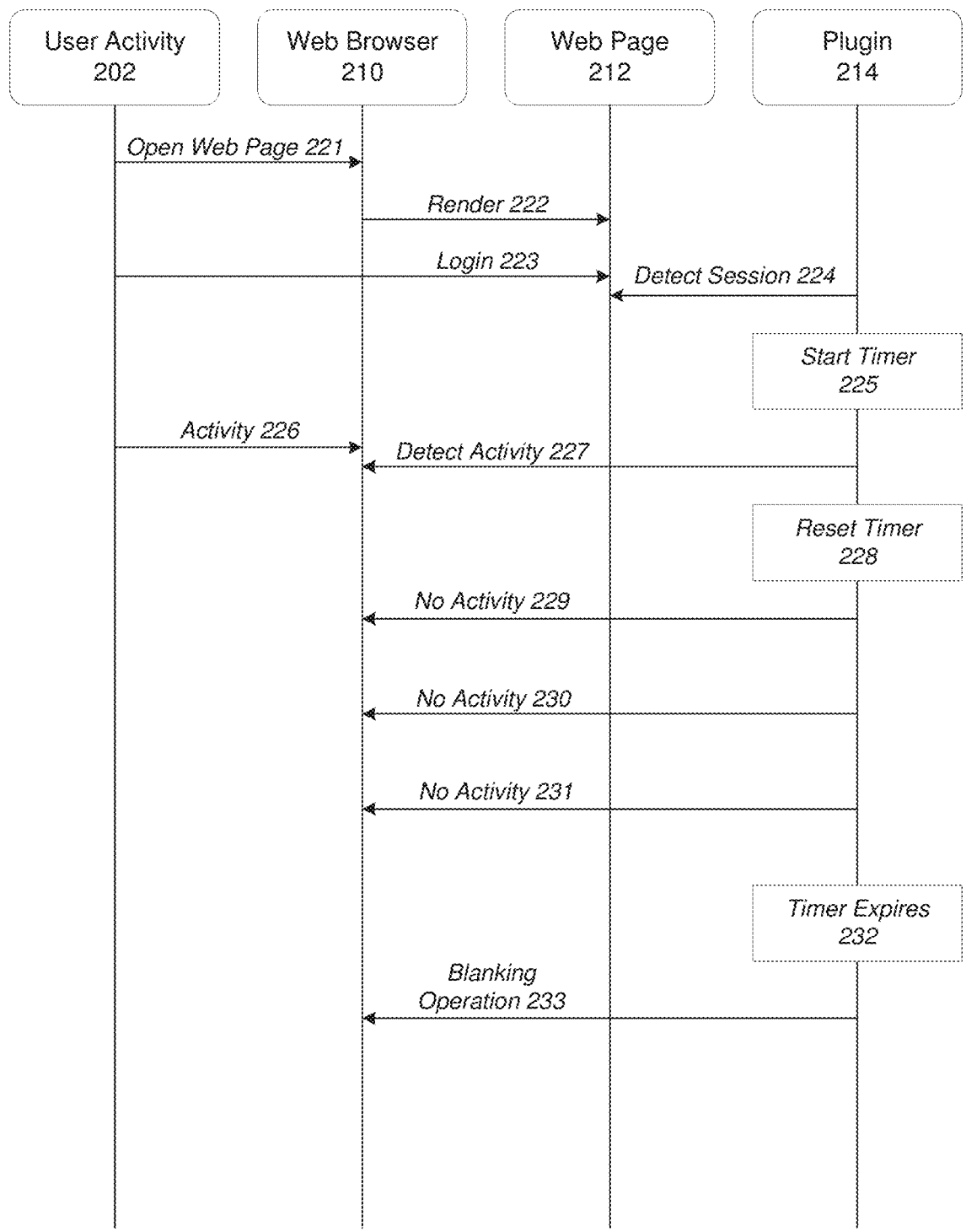
FIG. 2 is a diagram illustrating a communication sequence for enforcing a web session timeout according to example embodiments.

FIG. 2 illustrates a communication sequence 200 for enforcing a web session timeout according to example embodiments. Referring to FIG. 2, a web browser 210 displays a web page 212 and includes a plugin 214 installed therein. A user interacts with the web browser 210 which is represented as user activity 202. In this example, in 221 the user opens web page 212 within the web browser 210 which triggers a rendering of the web page 212 within the web browser 210, in 222. In this example, the web page 212 corresponds to a web portal requiring a user to login to view private data and access hosted functionality. In 223, the user logs into the web page 212 via one or more elements displayed on the web page 212. In 224, the plugin 214 detects the web session based on the user activity (login) on the web page 212 within the web browser 210 and starts a timer, in 225.

The timer continues until new user activity is detected in 226. Here, the plugin 214 detects the user activity in 227, and resets the timer in 228 back to its starting point. The plugin 214 may periodically attempt to detect user activity with respect to the web browser 210. For example, in 229, 230, and 231, the plugin 214 detects that no activity has occurred within the web browser 210. In 232, the timer expires. In response, in 233, the plugin 214 performs a concealing operation on the content within the web browser 210. Here, the plugin 214 may hide the content within a window of the web browser 210 using a gray/shaded box, a blanking or black filling within the window, a color, an overlay, and the like.

According to various embodiments, once the web browser plugin detects that the web page has opened a new user session, the plugin may start the count-down timer from a configured value (e.g., 5 minutes, 10 minutes, 30 minutes, etc.) In addition, the plugin may start monitoring user activity on this web page such as key strokes, mouse movements, page scrolling, cursor movement over the window, and the like. When the user activity is detected, the countdown timer is reset back to the initial value. However, when no activity is detected, the countdown timer expires (has value of '0') which triggers a web page blanking process. The web page may be left in a concealed state, preventing any surrounding users from seeing the web page content, which potentially contains the sensitive/confidential data. When user activity is subsequently detected, the concealed state disappears, showing the content of the web page.

The web browser plugin may detect both the beginning of the user session and the continuing user session. In other words, the web browser plugin may also determine whether the user session has ended, or more particularly, when the user session has not ended. The plugin may analyze different types of content to detect session information. For example, the plugin may analyze the content of the web page, to discover typical elements representing sign-in/sign-out elements. For example, the plugin may include a database of typical web page elements denoting the sign-in sign-out on a web page. In some embodiments the database may include keywords (with translations), like 'sign-out', 'log out', 'log-out', or icons representing the sign out (e.g., exit icon or power off icon, etc.) In some embodiments, the plugin may analyze hypertext transfer protocol (HTTP) traffic, cookies, and the like, looking for session identifiers such as 'session', 'sessionid', 'j sessionid', 'userid', and others containing keywords such as 'session' or 'user.'

Figure 3A:
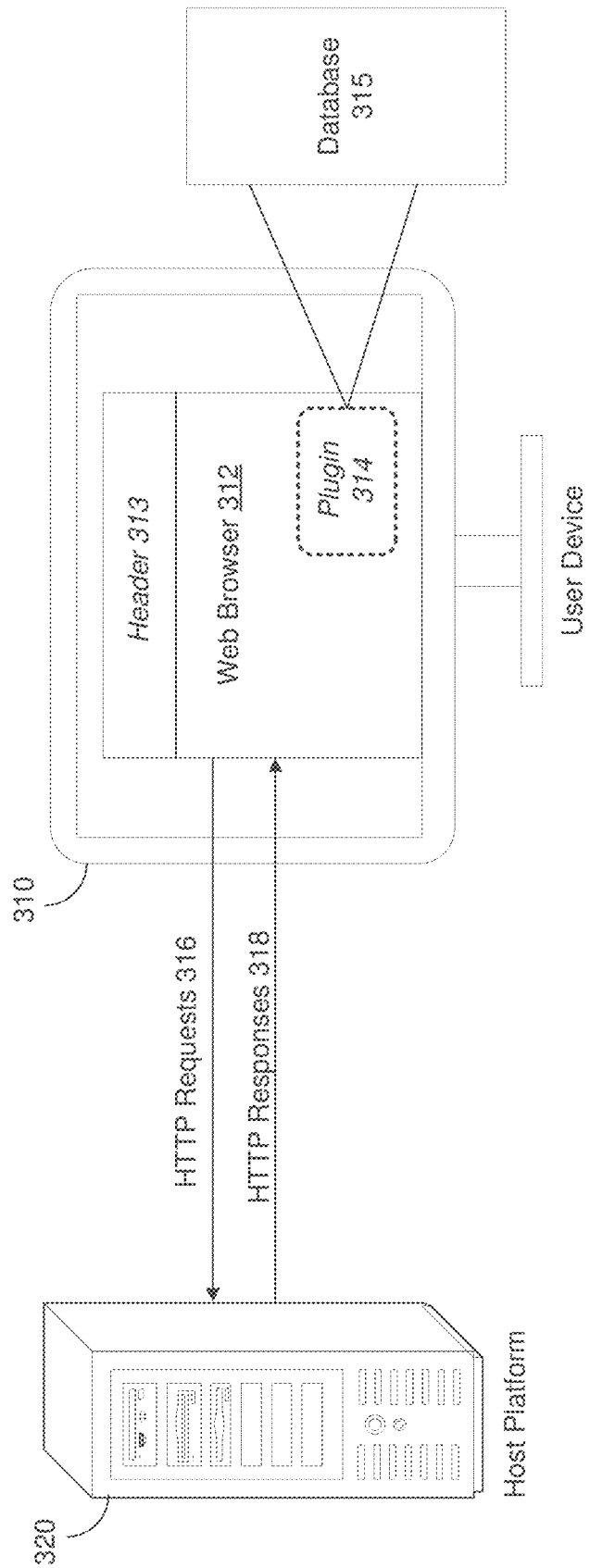
FIG. 3A is a diagram illustrating a process of detecting a web session based on HTTP traffic according to example embodiments.

FIG. 3A illustrates a process 300A of detecting a web session based on HTTP traffic according to example embodiments. Referring to FIG. 3A, a user device 310 running a web browser 312 may access a web page hosted by a host platform 320. In this case, the web browser 312 includes a plugin 314 which monitors network traffic between the web browser 312 on the user device 310 and the host platform 320. For example, the plugin 314 may monitor a header 313 of the web browser 312 to identify HTTP traffic. The plugin 314 may analyze the content within HTTP requests 316 to the host platform 320 and HTTP responses from the host platform 320. The plugin 314 may identify session information including a start of a session, a session ID, an end of a session, and the like. The plugin 314 may also determine whether a session has been timed out. If the session has not ended and has not been timed out, the session may be considered an active web session.

In this example, the plugin 314 may access the database 315 for keywords related to HTTP session information and use the keywords to determine whether a user session is currently active. Keywords stored in the database 315 may include session terms, login terms, logout terms, sign-in terms, sign-out terms, and the like.

Figure 3B:
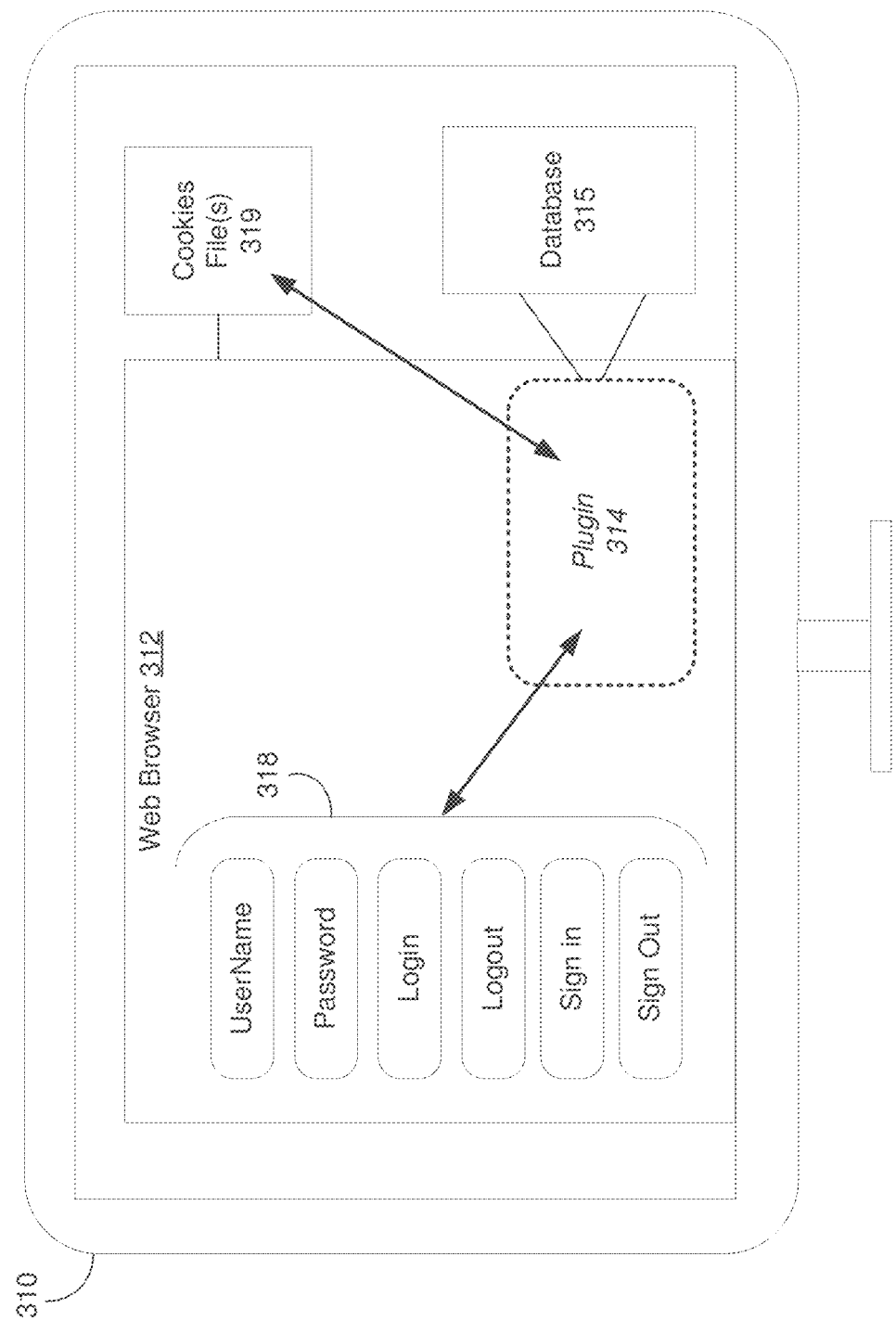
FIG. 3B is a diagram illustrating a process of detecting a web session based on content of a web browser according to example embodiments.

FIG. 3B illustrates a process 300B of detecting a web session based on content displayed within the web browser 312 or stored by the web browser 312, according to example embodiments. Referring to FIG. 3B, various content items 318 such as icons, display buttons, screen text, background text, and the like, within a web page displayed within the web browser 312 may be analyzed by the plugin 314 with respect to keywords stored in the database 315 to determine whether a user session is currently active. As another example, one or more cookies files 319 stored by the web browser 312 may be analyzed for keywords.

The cookies files 319 may include HTTP data as well as the header 313 in FIG. 3A. The cookies may include keywords such as sessionID, session, user ID, and other keywords associated with sessions.

In these examples, the plugin 314 analyzes network traffic between a web application (web page) displayed on a user device and a back-end service hosting the web application and observes the user activity on the web page. The plugin 314 may detect the presence of the user session by a number of built-in rules, which may be extended over the time. For example, an initial list of rules may cover the web page cookie (stored in web browser memory), or the session token keys, present in the HTTP headers of the webpage traffic.

FIG. 4 illustrates a method 400 of obscuring content of a web session after a period of inactivity according to example embodiments. For example, the method 400 may be performed by a plugin installed within a web browser running on a user device, and the like. Referring to FIG. 4, in 410 the method may include detecting a web session within an open window of a web browser. The web session may include an authentication between a user and a host system through the web browser. The web session may include sensitive data of the user such as payment account data, medical data, financial/loan data, tax data, and the like. Therefore, the web session may include information that the user desires to protect.

In some embodiments, the detecting may include detecting the web session exists or has just started based on hypertext transfer protocol (HTTP) traffic between the web browser and a host of a web page in the open window. In some embodiments, the detecting may include detecting the web session exists or has just started based on login and logout keywords included in one or more user interface (UI) elements displayed within the web browser. In some embodiments, the detecting may include detecting the web session exists or has just started based on session identifiers included in cookies stored within the web browser. In some embodiments, the detecting may also include detecting that the web session has not ended. Here, the same information may be used to identify whether a logout has occurred with respect to the active web session.

In 420, the method may include monitoring for user activity with respect to the web browser. For example, user activity may be monitored with respect to the web browser to determine whether the user is still active within the web session. The monitoring may include monitoring for one or more of keystrokes, mouse movements, cursor movements, page scrolling, and the like, within the web browser. The activity may be detected within an interior of a window of the web browser. As another example, the user activity may be detected from the user device in general based on input devices such as a mouse, a keyboard, or some other input mechanism.

In 430, the method may include determining that there has been a lack of user activity with respect to the web browser for a predetermined amount of time based on the monitoring of the user activity. Further, in 440, the method may include concealing content of the web session within the open window of the web browser in response to the lack of user activity. For example, content within the web browser may be hidden, obscured, covered, or the like. In one example, the web page viewing area of the web browser may be completely blanked using color or shading, or the like, while other visual elements such as menus, toolbars, search bars, and the like, may not be concealed. For example, a shaded block may be overlaid on the web browser window to prevent any information therein from being visible on the screen. Meanwhile, other windows running on the user device may remain visible. When the plugin detects additional user activity with respect to at least one of the computing device and the web browser, the plugin may undo the temporarily concealed web browser/web session.

In some embodiments, the monitoring may include starting a timer that is set to expire after the predetermined amount of time, and monitoring for the user activity while the timer counts down. The timer may continue to run until a new user activity has been detected. At which point the timer may be reset. If the timer runs until it expires, the plugin may determine that no user activity has been detected for a predetermined amount of time, and issue a timeout operation for concealing content within the web browser. Here, the determining may include determine that the timer has expired and there has been a lack of user activity between the start and the expiration of the timer, and the obscuring comprises obscuring the active web session in response.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
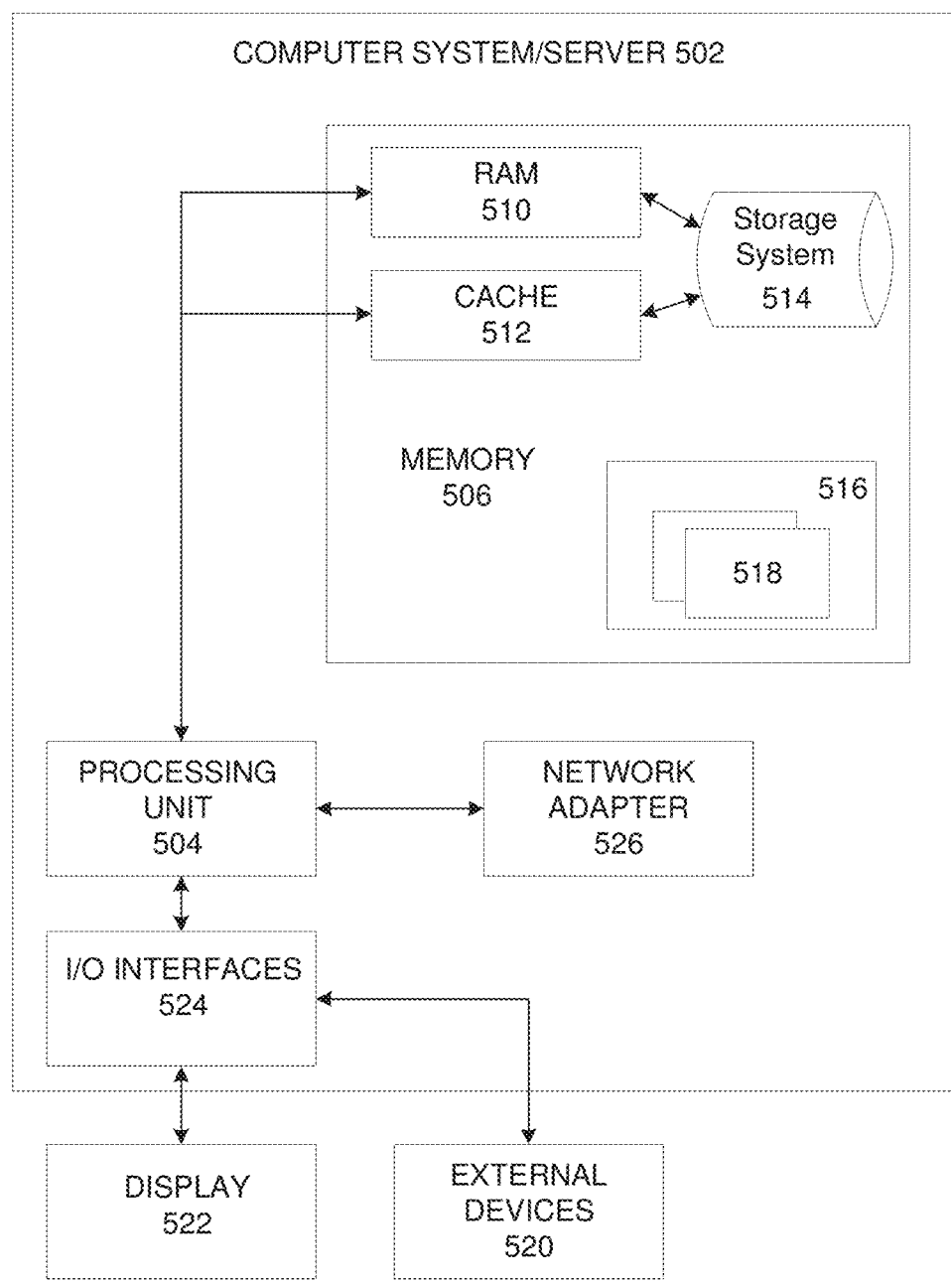
FIG. 5 is a diagram illustrating a computer system configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove. For example, the computing node 500 may be a network server of a larger enterprise network that connects multiple user workstations to the Internet, a private network, or the like.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units (processor) 504, a system memory 506, and a bus that couples various system components including the system memory 506 to the processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524 (which may be referred to herein as an output and/or an input). Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
   a processor that when executing one or more instructions stored in a memory is configured to:
   detect a first web session displaying content within an open window of a first browser tab of a web browser;
   detect a second web session having second browser tab of the web browser, the second browser tab having a window containing second content hidden by the first browser tab;
   identify that a lack of user activity associated with the second browser tab exceeds a predetermined time period; and
   temporarily conceal the hidden second content in response to the lack of user activity.

2. The apparatus of claim 1, wherein the processor is further configured to:
   detect user activity associated with the second tab web browser; and
   reveal the concealed content in response to the detection of user activity.

3. The apparatus of claim 1, wherein, when the processor is configured to detect a web session, the processor is further configured to:
   detect a web session based on login and logout keywords included in one or more user interface (UI) elements displayed within the web browser.

4. The apparatus of claim 1, wherein, when the processor is configured to detect a web session, the processor is further configured to:
   detect a web session based on session identifiers included in one or more of:
   cookies stored within the web browser, and
   a hypertext transfer protocol (HTTP) header of a webpage.

5. The apparatus of claim 1, wherein, when the processor is configured to identify that a lack of user activity exceeds a predetermined time period, the processor is further configured to:
   identify an expiration of a timer.

6. The apparatus of claim 5, wherein the processor is configured to:
   detect new user activity associated with the second tab prior to the expiration of the timer; and
   reset the timer in response to the detection of the new activity.

7. The apparatus of claim 1, wherein, when the processor is configured to temporarily conceal the hidden second content, the processor is further configured to:
   overlay a blank window over the hidden second content.

8. The apparatus of claim 1, wherein the user activity comprises one or more of:
   keystrokes, mouse movements, cursor movements, and page scrolls.

9. The apparatus of claim 1, wherein, when the processor is configured to temporarily conceal the hidden second content, the processor is further configured to:
   temporarily conceal only the hidden second content.

10. A method comprising:
    detecting, by a user device, a first web session displaying content within an open window of a first browser tab of a web browser displayed on the user device;
    detecting, by the user device, a second web session having second browser tab of the web browser, the second browser tab having a window containing second content hidden by the first browser tab;
    identifying, by the user device, that a lack of user activity associated with the second browser tab exceeds predetermined time period and
    temporarily concealing, by the user device, the hidden second content in response to the lack of user activity.

11. The method of claim 10, further comprising,
    detecting user activity associated with the second tab browser, and
    revealing the concealed content in response to the detection of user activity.

12. The method of claim 10, wherein the detecting a web session further comprises:
  detecting a web session based on login and logout keywords included in one or more user interface (UI) elements displayed within the web browser.

13. The method of claim 10 wherein the detecting a web session further comprises:
  detecting a web session based on session identifiers included in one or more of:
    cookies stored within the web browser, and
    a hypertext transfer protocol (HTTP) header of a webpage.

14. The method of claim 10, wherein the identifying that a lack of user activity exceeds a predetermined time period further comprises:
  identifying an expiration of a timer starting a timer that is set to expire after the predetermined amount of time, and monitoring for the user activity while the timer counts down.

15. The method of claim 14, wherein the method further comprises:
  detecting new user activity associated with the second tab prior to the expiration of the timer; and
  resetting the timer in response to the detecting the new activity.

16. The method of claim 14, wherein the temporarily concealing the hidden second content further comprises:
  overlaying a blank window over the hidden second content.

17. The method of claim 10, wherein the user activity comprises one or more of:
  keystrokes, mouse movements, cursor movements, and page scrolling.

18. The method of claim 10, wherein the temporarily concealing the hidden second content further comprises:
  temporarily concealing only the hidden second content-concealing content within the open window of the web browser without concealing content of any other applications running on the screen.

19. A non-transitory computer-readable medium comprising one or more instructions that when executed by a processor of a user device cause the processor to perform:
  detecting a first web session displaying content within an open window of a first browser tab of a web browser displayed on the user device;
  detecting a second web session having second browser tab of the web browser, the second browser tab having a window containing second content hidden by the first browser tab;
  identifying that a lack of user activity associated with the second browser tab exceeds a predetermined time period and
  temporarily concealing the hidden second content in response to the lack of user activity.

20. The non-transitory computer-readable medium of claim 19, wherein the one or more instructions further cause the processor to perform:
  detecting user activity associated with the second tab web browser and
  revealing the concealed content in response to the detection of user activity.

* * * * *